UNITED STATES PATENT OFFICE.

RUDOLF SCHÜLE, OF FRANKFORT-ON-THE-MAIN, GERMANY, ASSIGNOR TO CASSELLA COLOR COMPANY, A CORPORATION OF NEW YORK.

DISAZO-DYESTUFFS AND PROCESS OF MAKING THE SAME.

1,193,829.  Specification of Letters Patent.  Patented Aug. 8, 1916.

No Drawing.  Application filed October 8, 1914.  Serial No. 865,701.

*To all whom it may concern:*

Be it known that I, RUDOLF SCHÜLE, Ph. D., a subject of the Swiss Republic, residing at 45 Guenthersburg Allee, in Frankfort-on-the-Main, Germany, have invented new Disazo-Dyestuffs and Process of Making the Same, of which the following is a full description.

According to this invention disazo dyestuffs are obtained from aminoazo compounds and aminoaryl-8-oxy-1.2-naphthimidazole-sulfonic acids and are further diazotized (on the fiber) and developed with phenylmethylpyrazolone, phenol, cresol or resorcinol. The developed dyeings possess fine green shades and are of good quality as regards fastness to washing, soap and light. The various amins of the benzene and naphthalene series and their sulfonic acids are employed as first components and primary amins containing a free p-position and capable of being coupled particularly aminocresolether, α-naphthylamin and 1-naphthylamin-6- or 7-sulfonic acid are employed as middle components. The shades of the dye depend upon the selection of the components but dyeings having yellowish green to bluish green shades may be produced by developing with phenylmethylpyrazolone.

The process is illustrated by the following examples:—

Example I: 32.7 kilos of the monoazo dyestuff benzene-m-sulfonic acid azo-α-naphthylamin are diazotized with 6.9 kilos of sodium nitrite in 20 kilos of water at 20°–25° C. and 27 kilos of hydrochloric acid 19° Bé. The diazo compound thus obtained is then stirred into a solution of 35.5 kilos of m-aminophenyl-8-oxy-1.2-naphthimidazole-6-sulfonic acid containing 25 kilos of sodium carbonate and cooled with ice. After stirring the combination is soon complete and the dyestuff is salted out and filtered off. The dyestuff has the following structural formula:

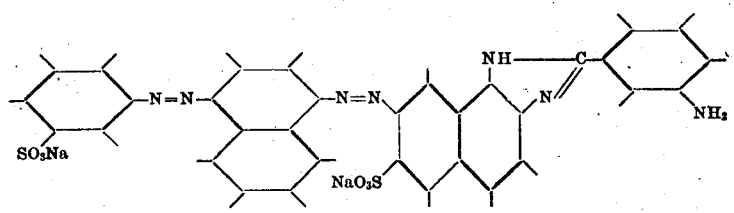

It is after having been dried and pulverized a dark powder soluble in water with a greenish black color, in concentrated sulfuric acid with a pure green color. It has a good affinity for cotton which is dyed a dull blackish green shade turning into a bright bluish green by diazotizing on the fiber and developing with phenylmethylpyrazolone.

Example 2: The diazo compound obtained from 23 kilos acetphenylenediaminsulfonic acid ($NH_2 : SO_3H : NH.C_2H_3O = 1:2:4$) is combined with 13.8 kilos aminocresolmethylether in an acetic acid solution. The resulting monoazo dyestuff is further diazotized by means of 6.9 kilos of sodium nitrite and hydrochloric acid at 15° C. and added to a solution of 43.5 kilos m-aminophenyl-8-oxy-1.2-naphthimidazole-3.6-disulfonic acid at 0° C. kept alkaline by means of sodium carbonate. The dyestuff is salted out by common salt from the warmed solution. It has the following structural formula:

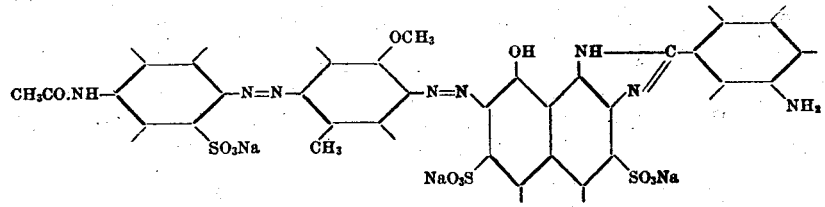

The dyestuff is soluble in water with a greenish black color, with concentrated sulfuric acid it yields a bluish green solution. It dyes cotton bluish black-green shades which are changed into a very clear yellowish green by developing with phenylmethylpyrazolone. By developing with phenol or resorcinol bluish green or yellowish green shades are obtained.

Example 3: By substituting for the aminocresolmethylether in Example 2, 14.3 kilos α-naphthylamin, a very similar dyestuff is obtained; the direct and developed dyeings are however somewhat more bluish green in shade. The solution in water is of a greenish black color, in concentrated sulfuric acid of a dark green color. It has the following structural formula:

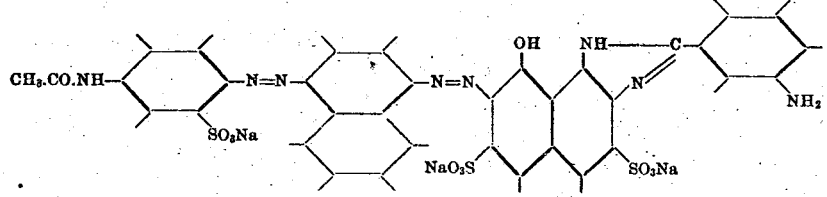

Example 4: 22.3 kilos α-naphthylamin-2-sulfonic acid are diazotized by means of 6.9 kilos sodium nitrite and hydrochloric acid. The diazo compound thus obtained is combined in an acetic acid solution with 13.8 kilos of aminocresolmethylether. The monoazo dyestuff is filtered off and is then further diazotized by means of 6.9 kilos sodium nitrite and hydrochloric acid. The diazoazo compound thus formed is again filtered off, stirred with ice water and allowed to flow into a soda alkaline solution containing 35.5 kilos m.-aminophenyl-8-oxy-1.2-naphthimidazole-5-sulfonic acid produced from the diaminoacid

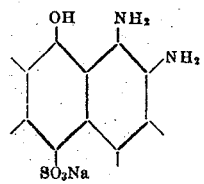

The dyestuff is separated from the warmed solution by means of common salt. It corresponds to the structural formula:

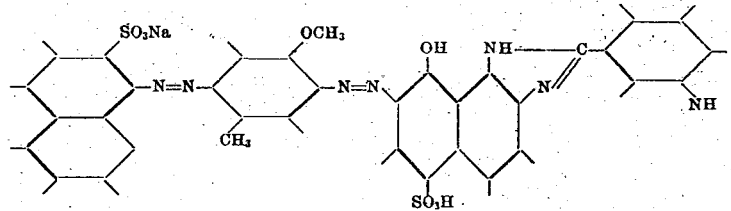

The dyestuff is soluble in water with a blackish green color. It equally dissolves in concentrated sulfuric acid yielding a blackish green solution. It dyes cotton bluish black-green shades which turn into bluish green shades on developing with phenylmethylpyrazolone.

Having now particularly described and ascertained the nature of my said invention and in what manner the same is to be performed, I declare that what I claim is:—

1. The manufacture of disazo dyestuffs by combining a diazo compound with a primary aromatic amin containing a free p-position, rediazotizing the monoazo dyestuff thus formed and combining with an aminoaryl-8-oxy-1.2-naphthimidazolesulfonic acid substantially as described.

2. As new products the disazo dyestuffs prepared by combining a diazo compound with a primary aromatic amin containing a free p-position, rediazotizing the monoazo dyestuff thus formed and combining with an aminoaryl-8-oxy-1.2-naphthimidazole-sulfonic acid, these dyestuffs being in the dry state dark powders, dissolving in water with a greenish-black color, in concentrated sulfuric acid with a green color, dyeing cotton blackish-green shades, which are changed on being developed on the fiber with phenylmethylpyrazolone into brilliant green shades, substantially as described.

In witness whereof I have hereunto signed my name this 17th day of Sept., 1914, in the presence of two subscribing witnesses.

Dr. RUDOLF SCHÜLE.

Witnesses:
  JEAN GRUND,
  CARL GRUND.

It is hereby certified that in Letters Patent No. 1,193,829, granted August 8, 1916, upon the application of Rudolf Schüle, of Frankfort-on-the-Main, Germany, for an improvement in "Disazo-Dyestuffs and Processes of Making the Same," errors appear in the printed specification requiring correction as follows: Page 2, line 36, formula, for "$SO_3Na$" read $SO_3H$; same page, line 59, formula, for "$SO_3H$" read $SO_3Na$; and that the said Letters Patent should be read with these corrections therein that the same may conform to the record of the case in the Patent Office.

Signed and sealed this 12th day of September, A. D., 1916.

[SEAL.]

F. W. H. CLAY,

*Acting Commissioner of Patents.*